Patented Oct. 14, 1952

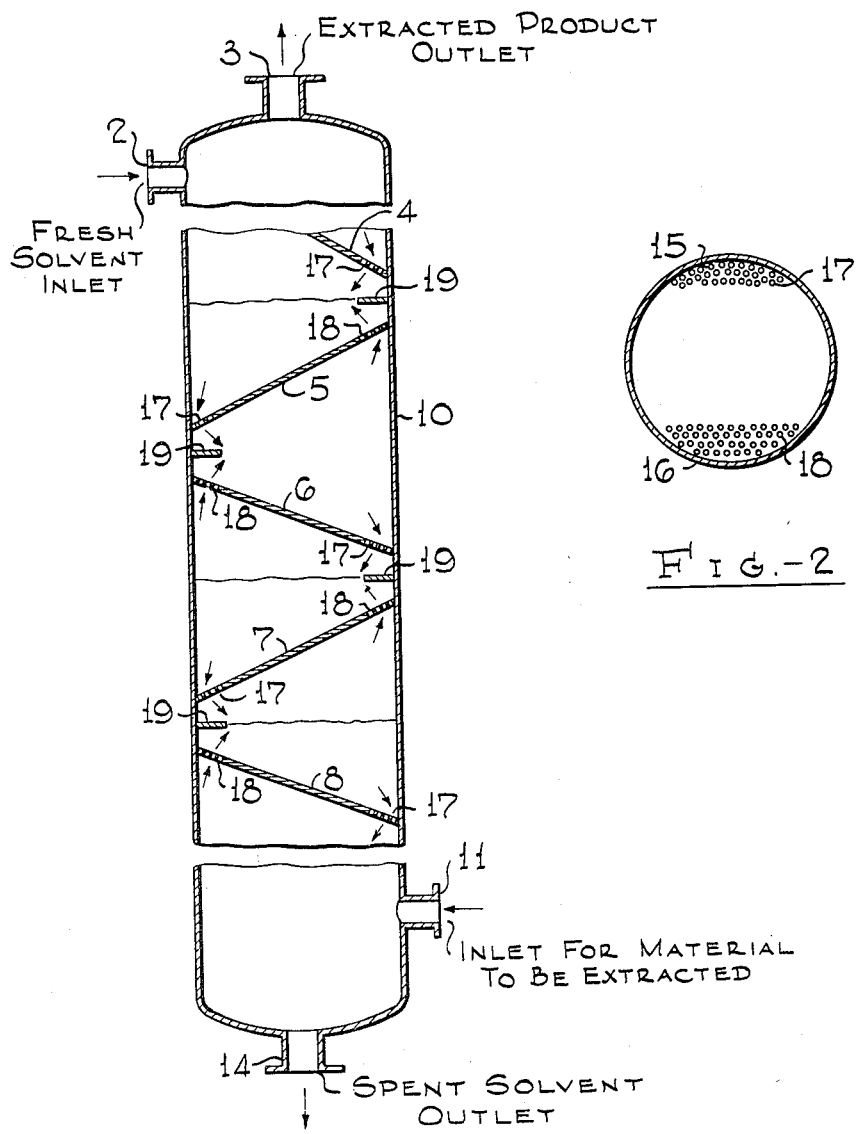

2,614,031

UNITED STATES PATENT OFFICE 2,614,031

LIQUID-LIQUID EXTRACTION TOWER

Richard B. Tickler, Baton Rouge, La., assignor to Standard Oil Development Company, a corporation of Delaware Application April 19, 1950, Serial No. 156,814

2 Claims. (Cl. 23—270.5)

The present invention relates to an improved process and apparatus for the contacting of two normally immiscible, or partly miscible liquids. The invention is adapted for the contacting of liquids in any liquid-liquid system. In accordance with the present invention a novel perforated plate construction is employed in a vertical tower characterized by providing countercurrent mixing and concurrent settling in each pair of plates throughout the tower.

The invention is directed broadly to processes in which liquids are treated by selective solvent action. At the present time there are a great many chemical processes in which a selective solvent is used to treat a particular liquid in order to secure a partial segregation, or removal of chemical constituents of the liquid. For example, petroleum oils are conventionally treated with solvents such as liquid sulfur dioxide, phenol, cresote, nitrobenzene, furfural, aniline, ether and other solvents or mixture of such solvents. Use of these solvents with petroleum oils is particularly employed to remove low viscosity index constituents of the oil to obtain a treated oil having an improved viscosity index. More generally, such solvent treating processes are employed to selectively remove undesired constituents from the liquid being treated with the solvent or in some cases to recover desired constituents.

In solvent treating operations of the general character above described, many modifications are used to control the solvent extraction process as desired. For example, auxiliary solvents, or modifying agents may be injected into the treating system. Again a wide range of temperature and pressure conditions may be employed in particular types of solvent extractions. The present invention is not concerned with the modifications or refinements of solvent treating processes. However, the invention is concerned with the basic method and apparatus used for contacting liquids whatever the particular system may be. It is therefore, to be understood that this invention is of application to any liquid-liquid contacting system with any of the modifications which may be employed in such processes.

Many methods have been devised for the contacting of liquids. However, it has been found more advantageous to effect large volume interfluid treating in contacting towers rather than in mixers and settlers, centrifuges, etc. Processing in towers is more advantageous from the economic viewpoint because of the lower initial and operating costs. Consequently, considerable attention has been given to the apparatus required for efficient liquid-liquid contacting in towers. The towers which have been employed have been of a wide variety of types some employing various types of packing materials, others employing bubble cap plates and others employing a wide variety of internal baffles. However, of the various types of fluid contacting towers developed, those involving the use of pierced plates have proved to be particularly advantageous in the processing of large quantities of liquids.

Conventional pierced plate towers consist of a large number of horizontally disposed perforated plates extending throughout the tower. The plate perforations provide orifices through which at least one of the liquids may be dispersed. Heretofore, the pierced plates known to the art have been characterized by plate efficiencies not substantially greater than about 50%. By plate efficiency as that term is used, it is meant that each plate is effective in accomplishing a percentage contacting efficiency of the contact achieved at equilibrium in a single batch stage mixer and settler. Thus one theoretical stage is established by contacting two liquids intimately in a batch mixer followed by a thorough settling in a batch settler. As stated, therefore, conventional pierced plate liquid contacting towers, due to their plate efficiency of about 50% substantially require a number of plates exceeding by a factor of two the number of theoretical stages of contacting required. It is clearly of the greatest importance to improve the plate efficiency of the types of pierced plates used in such towers in order to decrease the expense of the contacting and to decrease the size of the towers necessary. It is, therefore, the principal object of this invention to provide an improved type of pierced plate extraction tower in which the plate efficiencies are substantially above 50%.

In analyzing the necessary mechanism required in liquid-liquid contacting it is apparent that two basic effects are required. These are efficient mixing of the liquids followed by efficient separation of the mixed liquids. Thus in extraction towers having a given number of plates for best efficiency it is necessary that each plate, or set of plates, provide good mixing and provide good settling. Only by achieving both of these desiderata in such a tower is it possible to secure many theoretical stages. Conversely considering any one extraction plate, such a plate can only have a high plate efficiency if the plate is capable of both thoroughly mixing and thoroughly separating the mixed liquids. It is, therefore, a further and more particular object of this invention to provide a type of pierced plate which will most effectively be capable of thoroughly mixing and thoroughly settling liquid phases passing through the plate.

In developing a particular pierced plate design for contacting a given liquid-liquid system, it is necessary to secure certain basic data as to the mixing and settling characteristics of the liquids concerned. For example, certain liquids may be very readily mixed, but when mixed are difficult to separate. Alternatively, other types of liquids are difficult to mix but may be readily separated. As a result of this factor extraction towers known to the prior art have been of different types depending upon the particular liquid-liquid system to be contacted. One of the objects of this invention is to provide an extraction tower which may be readily designed for any liquid-liquid system to provide the necessary mixing and settling to meet the particular characteristics of the liquids to be treated. Thus the extraction tower of the present invention is adapted to the contacting of two liquids which are easy to mix but hard to separate, such as phenol and oil, or to the contacting of two liquids which are difficult to mix but easy to separate such as caustic solutions and oil.

In accordance with these objectives of the present invention, a novel pierced plate design has been developed which provides an intimate counter-current mixing of the liquids to be contacted in a confined portion of the plate, and which provides an enlarged section of the plate through which the mixed liquids may concurrently flow to attain efficient separation of the mixed liquids prior to re-mixing in subsequent plates. The nature of this invention may be fully understood from a consideration of the accompanying drawings as referred to in the following description. In these drawings Fig. 1 illustrates a complete extraction tower embodying the novel pierced plates of this invention, and Fig. 2 illustrates a plan view of one of the pierced plates of this invention.

Referring to Fig. 1, particularly as clarified by reference to Fig. 2, it is assumed that a liquid such as petroleum oil is to be treated with a solvent such as phenol. The phenol may be introduced into the top of the extraction tower 10 by means of line 2 while the oil to be treated may be introduced at the bottom of the tower by means of line 11. The oil which has been solvent treated will then be removed from the top of the tower through line 3, while the spent phenol will be removed from the bottom of the tower through line 14. Angularly disposed in zig-zag relationship throughout the vertical length of the tower are a plurality of flat pierced plates indicated by numerals 4, 5, 6, 7, 8 etc. Each of the plates is provided with two oppositely and peripherally disposed portions 15 and 16 perforated by a plurality of holes 17 and 18, which may if desired be suitable slots or other types of perforations. The plates are preferably disposed at 45° angles with reference to the tower wall but this is not critical, any angular relationship between 30 and 60° being suitable. It will be observed that each plate is of the same construction and are so arranged in the tower that each plate converges at the tower wall with the plate above or below leaving a comparatively small confined zone therebetween at the tower wall which zone becomes progressively wider in the direction of the opposite tower wall. Each plate is so arranged that the peripherally perforated portions thereof are placed next to the wall of the tower. By this means it can be seen that a perforated portion of the plate is above or below the perforated portion of another plate, and defines at least the major portion of the small confined zones. As will be seen this construction provides a confined zone for intimately mixing the fluids and a large zone for enabling efficient separating of the mixed fluids. A baffle 19 extending perpendicularly a short distance from the wall of the tower may be provided at a point half-way between the points where adjacent plates converge on the tower wall, thus bisecting the confined mixing zone.

In considering the manner in which the apparatus illustrated in the drawings operates, as stated, it is assumed that the liquids to be contacted are phenol and oil. Phenol being introduced to the top of the tower and being of a greater density than oil tends to flow downwardly through the tower counter-current to the flow of oil introduced at the bottom of the tower. A layer, or head of phenol will build up on each of the individual plates. Similarly a layer or head of oil will build up beneath each of the plates. The interface between the layers of phenol and oil will extend substantially across the tower. In the manner sufficient pressure will be provided so that the phenol and oil will be jetted through the perforations counter-currently to each other. Thus phenol will be jetted downwardly through the perforations 17 while oil will be jetted upwardly through the perforations 18. The counter-currently moving phenol and oil will be intimately mixed in the comparatively confined space between these two perforated sections of the respective plates. The mixed oil and phenol, in the form of an unstable emulsion will then flow outwardly toward the opposite ends of the tower into the enlarged settling zone provided. Due to the enlargement of this section of the tower, the flow of the liquids in this portion of the tower will be comparatively slow. Furthermore, both the phenol and the oil will be flowing in the same general direction; that is, toward the opposite side of the tower away from the mixing zone. Consequently, the phenol and oil are enabled to separate efficiently in this part of the tower. Oil will tend to separate and to collect on the underside of plate 4, while phenol will tend to separate and collect on the upperside of plate 5. Separated oil will then pass upwardly through perforations 18. Similarly phenol will flow downwardly to and through the perforations 17. As described, therefore, the apparatus illustrated functions by maintaining a counter-current jetting of the liquids in a confined portion of adjacent plates followed by concurrent flow of the liquids in an enlarged settling zone followed by flow of the separated liquids into successive mixing zones of further plates.

It is apparent that by adjusting the perforations of the mixing zone and by changing the positioning of the adjacent portions of the plates providing the mixing zones, the degree of mixing attained may be adjusted to provide any desired degree of mixing. It is further apparent that by adjusting the angular elevation of successive plates, it is possible to enlarge, or decrease the settling zone provided so as to attain the desired degree of settling for a particular liquid system. It is, therefore, to be understood that the invention is not limited to any particular angular setting of the plates. However, for the purposes of clarity an embodiment of this invention particularly adaptable to the treating of phenol and oil will be given indicating the requisite perforations and dimensions. In such an embodiment of the invention the tower 10, may have a diameter of about 12 feet. The vertical height of the tower may be chosen to provide any desired number of stages. The settling zone provided between the adjacent plates may extend horizontally for about 10½ feet. The portions of the plates providing the perforations for the mixing zones may extend horizontally about 1½ feet. It is convenient to drill a large number of small holes in the proper sections of each plate to provide the orifices through which the liquids are jetted. These holes may be of about one-fourth inches in diameter, although the diameter of the holes is not particularly critical. The holes through which the phenol is to be jetted into the mixing zones may comprise about 4000 quarter inch holes, while the holes through which the oil is to be jetted into the mixing zone may comprise about 3000 quarter inch holes.

As described, therefore, the novel extraction plate of this invention comprises a perforated plate set at an angle in the tower providing a confined countercurrent mixing zone between pairs of plates and providing an enlarged concurrent settling zone adjacent each mixing zone. The perforated area of the plate amounts to about 3% of the total area of the plate. The diameter of the plates, and the number of plates employed may be chosen at will, depending upon the volume and extent of the treat required.

The nature and objects of the present invention having been thus fully set forth, what is claimed as new and useful and desired to be secured by Letters Patent is:

What is claimed is:

1. In a liquid-liquid extraction tower, the combination comprising a shell, a vertical series of transverse plate members sealed peripherally to the shell in zig-zag, angularly sloped relationship thereto, and to each other, each pair of plates extending from an area of vertically spaced maximum convergence against the shell to a diametrically opposed area of vertically spaced maximum divergence against the shell, each pair of plates with the shell defining a confined mixing zone in said area of maximum convergence, and a settling zone in direct communication with said mixing zone extending laterally therefrom and progressively enlarged toward the opposite area of maximum divergence, diametrically opposed perforated areas in each plate adjacent the shell wall substantially corresponding to said areas of maximum convergence and divergence respectively, an inlet to said shell above the uppermost plate in said series and an outlet below the lowermost plate thereof.

2. A liquid-liquid extraction tower according to claim 1 in which is provided a baffle member in perpendicular relationship to the shell mid-way between plate members in the area of maximum convergence thereof and bisecting said confined mixing chamber.

RICHARD B. TICKLER.

REFERENCES CITED

The following references are of record in the file of this patent:

UNITED STATES PATENTS

| Number | Name | Date |
| --- | --- | --- |
| 390,537 | Webster | Oct. 2, 1888 |
| 569,456 | Hauhtman | Oct. 13, 1896 |
| 1,050,322 | Woodworth | Jan. 14, 1913 |
| 1,320,396 | Laird | Nov. 4, 1919 |